United States Patent
Takeda

(10) Patent No.: US 12,129,781 B2
(45) Date of Patent: Oct. 29, 2024

(54) EXHAUST GAS AFTERTREATMENT DEVICE FOR INTERNAL COMBUSTION ENGINE

(71) Applicant: ISUZU MOTORS LIMITED, Tokyo (JP)

(72) Inventor: Syogo Takeda, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 18/546,501

(22) PCT Filed: Mar. 10, 2022

(86) PCT No.: PCT/JP2022/010508
§ 371 (c)(1),
(2) Date: Aug. 15, 2023

(87) PCT Pub. No.: WO2022/191272
PCT Pub. Date: Sep. 15, 2022

(65) Prior Publication Data
US 2024/0141813 A1     May 2, 2024

(30) Foreign Application Priority Data

Mar. 11, 2021   (JP) .................................. 2021-039430

(51) Int. Cl.
*F01N 3/20*     (2006.01)
*F01N 3/035*    (2006.01)
*F01N 3/28*     (2006.01)

(52) U.S. Cl.
CPC ........... *F01N 3/2053* (2013.01); *F01N 3/035* (2013.01); *F01N 3/2892* (2013.01);
(Continued)

(58) Field of Classification Search
CPC ...... F01N 3/035; F01N 3/2053; F01N 3/2892; F01N 2240/20; F01N 2240/26; F01N 2410/00; F01N 2900/1406
See application file for complete search history.

(56) References Cited

U.S. PATENT DOCUMENTS

| | | |
|---|---|---|
| 5,142,864 A | 9/1992 | Dunne |
| 2003/0233825 A1 | 12/2003 | Asanuma et al. |
| 2018/0106205 A1 | 4/2018 | Jammoussi et al. |

FOREIGN PATENT DOCUMENTS

| | | | |
|---|---|---|---|
| CN | 103850763 A | 6/2014 | |
| DE | 102019201048 A1 * | 7/2020 | ............. B60K 13/04 |

(Continued)

OTHER PUBLICATIONS

Patent Cooperation Treaty, International Search Report, Application No. PCT/JP2022/010508, dated Apr. 12, 2022, in 7 pages.
(Continued)

*Primary Examiner* — Audrey B. Walter
(74) *Attorney, Agent, or Firm* — PROCOPIO, CORY, HARGREAVES & SAVITCH LLP

(57) ABSTRACT

An exhaust gas aftertreatment device 30 of an internal combustion engine 1 includes a catalyst 24 provided in an exhaust passage 4, a first branch passage 31 having one end 35 connected to an exhaust passage downstream of a catalyst, a second branch passage 32 having one end 38 connected to the exhaust passage upstream of the catalyst, a tank 33 to which the other end 36 of the first branch passage and the other end 39 of the second branch passage are connected and capable of storing exhaust, a valve mechanism 34 configured to switch open and closed states of the first branch passage, the second branch passage, and a downstream portion 41 of the exhaust passage downstream of a branch point 37 to which the one end of the first branch (Continued)

passage is connected, and a control unit 100 configured to control the valve mechanism.

3 Claims, 7 Drawing Sheets

(52) U.S. Cl.
CPC ...... *F01N 2240/20* (2013.01); *F01N 2240/26* (2013.01); *F01N 2410/00* (2013.01); *F01N 2900/1406* (2013.01)

(56) References Cited

FOREIGN PATENT DOCUMENTS

| FR | 3067754 A1 | * | 12/2018 | ............... F01N 3/10 |
|----|------------|---|---------|---------------------------|
| JP | 2004-011485 A | | 1/2004 | |
| JP | 2005-105909 A | | 4/2005 | |
| JP | 2012020711 A | * | 2/2012 | |
| JP | 2021-050714 A | | 4/2021 | |

OTHER PUBLICATIONS

Patent Cooperation Treaty, WOSA, Application No. PCT/JP2022/010508, dated Apr. 12, 2022, in 5 pages.

\* cited by examiner

EXHAUST GAS AFTERTREATMENT DEVICE FOR INTERNAL COMBUSTION ENGINE

CROSS-REFERENCE TO RELATED APPLICATIONS

This application is US National Stage of International Patent Application PCT/JP2022/010508, filed Mar. 10, 2020, which claims benefit of priority from Japanese Patent Application JP2021-039430, filed Mar. 11, 2021, the contents of both of which are incorporated herein by reference.

TECHNICAL FIELD

The present disclosure relates to an exhaust gas aftertreatment device of internal combustion engine.

BACKGROUND ART

In an exhaust gas aftertreatment device of internal combustion engine, a catalyst is provided in an exhaust passage, and by passing exhaust through the catalyst, harmful components contained in the exhaust are removed.

CITATION LIST

Patent Literature

Patent Literature 1: JP2005-105909A

SUMMARY OF INVENTION

Technical Problem

However, the catalyst is inactive after a cold start of the internal combustion engine. At this time, even if the exhaust passes through the catalyst, the harmful components in the exhaust cannot be sufficiently removed, and the harmful components may be emitted into the atmosphere.

The present disclosure has been made in view of the above circumstances, and an object of the present disclosure is to provide an exhaust gas aftertreatment device of internal combustion engine that can reduce emissions of harmful components in the exhaust into the atmosphere when a catalyst is inactive.

Solution to Problem

According to an aspect of the present disclosure, there is provided an exhaust gas aftertreatment device of internal combustion engine, the exhaust gas aftertreatment device including:
  a catalyst provided in an exhaust passage;
  a first branch passage having one end connected to the exhaust passage downstream of the catalyst;
  a second branch passage having one end connected to the exhaust passage upstream of the catalyst;
  a tank to which the other end of the first branch passage and the other end of the second branch passage are connected and capable of storing exhaust;
  a valve mechanism configured to switch open and closed states of the first branch passage, the second branch passage, and a downstream portion of the exhaust passage downstream of a branch point to which the one end of the first branch passage is connected; and
  a control unit configured to control the valve mechanism, wherein the control unit controls the valve mechanism to open the first branch passage, close the second branch passage and close the downstream portion when the catalyst is inactive, and controls the valve mechanism to close the first branch passage, open the second branch passage and open the downstream portion when the catalyst is active.

Preferably, the exhaust gas aftertreatment device includes a pump provided in the first branch passage and configured to pressure-feed exhaust to the tank, and the control unit controls the pump to operate when the catalyst is inactive and to stop when the catalyst is active.

Preferably, the pump is implemented by a compressor of a turbocharger or supercharger.

Preferably, the exhaust gas aftertreatment device includes a negative pressure pump provided in the first branch passage and configured to suction exhaust from the tank, and the control unit controls the valve mechanism to close the first branch passage, open the second branch passage, and open the downstream portion when the catalyst is switched from inactive to active, and then controls the valve mechanism to close the second branch passage and open the first branch passage and controls the negative pressure pump to operate.

Preferably, the negative pressure pump is implemented by a compressor of a turbocharger or supercharger.

Preferably, the control unit controls the valve mechanism also based on a pressure in the tank.

Advantageous Effects of Invention

According to the present disclosure, it is possible to reduce emissions of harmful components in the exhaust into the atmosphere when a catalyst is inactive.

DESCRIPTION OF EMBODIMENTS

Hereinafter, embodiments of the present disclosure will be described with reference to the accompanying drawings. It should be noted that the present disclosure is not limited to the following embodiments.

First Embodiment

Figure 1:
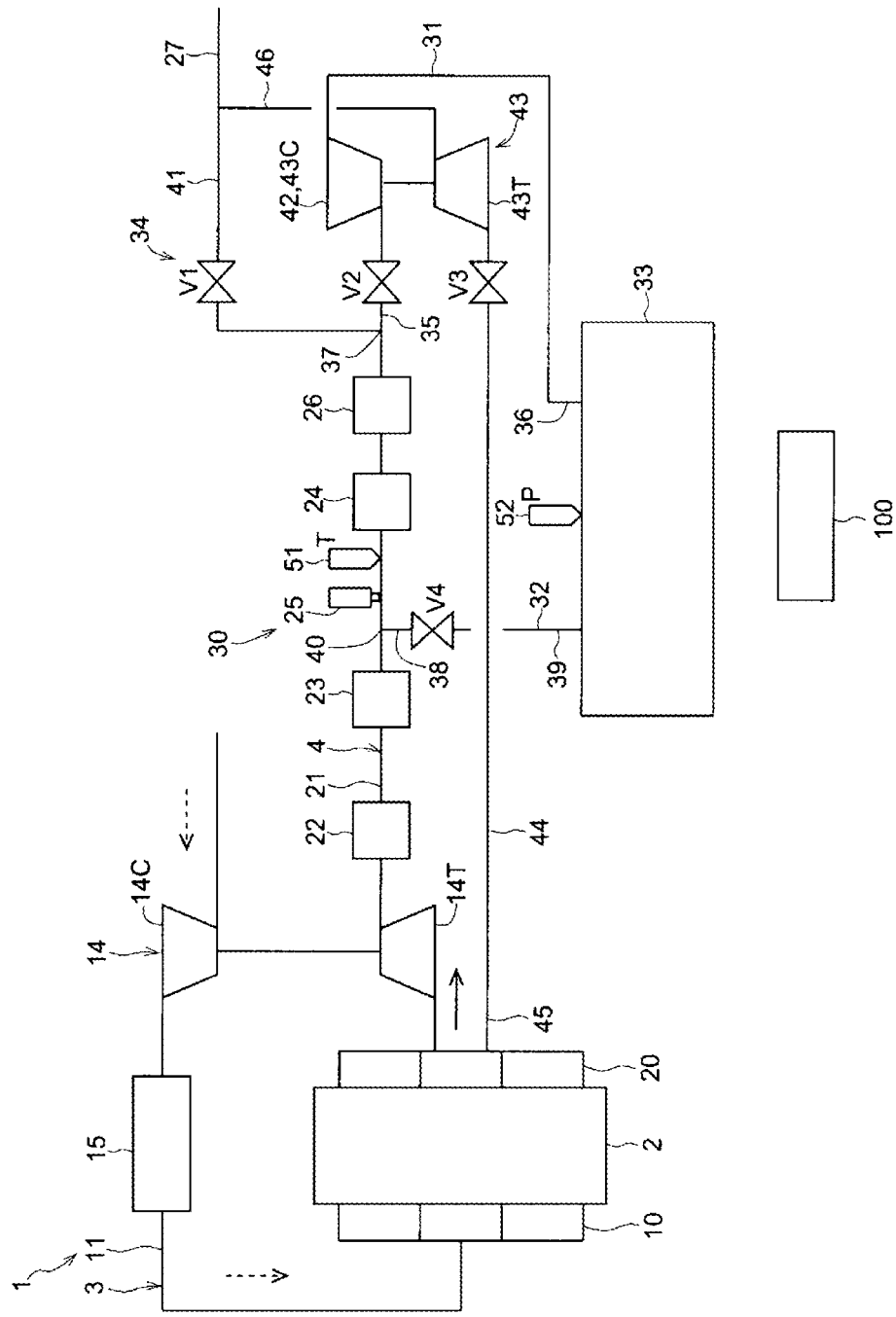
FIG. 1 is a schematic diagram showing an internal combustion engine of a first embodiment.

FIG. 1 is a schematic diagram of an internal combustion engine according to a first embodiment of the present disclosure. An internal combustion engine (also referred to as an engine) 1 is a multi-cylinder compression-ignition internal combustion engine mounted on a vehicle, specifically an in-line four-cylinder diesel engine. The vehicle is a large vehicle such as a truck. However, a type, a form, an application, and the like of the vehicle and the internal combustion engine are not particularly limited. For example, the vehicle may be a small vehicle such as a passenger vehicle, and the engine may be a spark ignition internal combustion engine (specifically, a natural gas engine or a gasoline engine). The engine may be mounted on a moving object other than a vehicle, for example, a ship, a construction machine, or an industrial machine. The engine may not be mounted on a moving object and may be of a stationary type.

An engine 1 includes an engine body 2, and an intake passage 3 and an exhaust passage 4 connected to the engine body 2. The engine body 2 includes structural components such as a cylinder head, a cylinder block, and a crankcase, and movable components such as a piston, a crankshaft, and a valve accommodated therein.

The intake passage 3 is mainly defined by an intake manifold 10 connected to the engine body 2 and an intake pipe 11 connected to an upstream end of the intake manifold 10. The intake pipe 11 is provided with a compressor 14C of a turbocharger 14 and an intercooler in this order from upstream. A flow direction of intake air is indicated by a dashed arrow.

The exhaust passage 4 is mainly defined by an exhaust manifold 20 connected to the engine body 2 and an exhaust pipe 21 disposed downstream of the exhaust manifold 20. A turbine 14T of the turbocharger 14 is provided in the exhaust pipe 21 or between the exhaust manifold 20 and the exhaust pipe 21. A flow direction of the exhaust is indicated by a solid arrow. A downstream end 27 of the exhaust passage 4 or the exhaust pipe 21 is open to the atmosphere.

The exhaust pipe 21 downstream of the turbine 14T is provided with a catalyst for removing harmful components (CO (carbon monoxide), HC (hydrocarbon), NOx (nitrogen oxide), etc.) in the exhaust. In the case of the present embodiment, a plurality of catalysts are provided in the exhaust pipe 21, and specifically, four catalysts of an oxidation catalyst 22, a filter 23, a NOx catalyst 24, and an ammonia oxidation catalyst 26 are provided in this order from upstream.

The oxidation catalyst 22 oxidizes and removes unburned components (CO, HC) in the exhaust, raises the temperature of the exhaust with the heat of reaction at this time, and oxidizes NO in the exhaust to $NO_2$. The filter 23 is a filter with a catalyst of a continuous regeneration type, which collects particulate matter (PM) contained in the exhaust and continuously burns and removes the captured PM. Since the filter 23 includes a catalyst, the filter 23 is treated as a kind of catalyst. The NOx catalyst 24 is a selective reduction NOx catalyst or a selective catalytic reduction (SCR) catalyst, and reduces and removes NOx in the exhaust using ammonia derived from urea water injected from a urea water injection valve 25 upstream of the NOx catalyst 24 as a reducing agent. The ammonia oxidation catalyst 26 oxidizes and removes excess ammonia emitted from the NOx catalyst 24.

The oxidation catalyst 22, the filter 23, the NOx catalyst 24, the ammonia oxidation catalyst 26, and the urea water injection valve 25 constitute an exhaust gas aftertreatment device for performing exhaust after-treatment. The urea water injection valve 25 is provided in the exhaust passage 4 between the filter 23 and the NOx catalyst 24.

The exhaust gas aftertreatment device 30 includes a first branch passage 31 and a second branch passage 32 branched from the exhaust passage 4 (specifically, the exhaust pipe 21), a tank 33 capable of storing exhaust, a valve mechanism 34, and an electronic control unit (ECU) 100 serving as a control unit.

The exhaust gas aftertreatment device 30 of the present embodiment is configured to reduce NOx emissions into the atmosphere when the NOx catalyst 24 is inactive. That is, the NOx catalyst 24 and NOx are a combination of a target catalyst and a harmful component. However, the combination can be changed. For example, a combination of the oxidation catalyst 22 and CO, HC, a combination of the filter 23 and PM, or a combination of the ammonia oxidation catalyst 26 and ammonia may be used.

The first branch passage 31 has one end 35 connected to the exhaust passage 4 downstream of the NOx catalyst 24 and the other end 36 connected to the tank 33. A branch point 37 is provided in the exhaust passage 4 downstream of the ammonia oxidation catalyst 26, and the one end 35 is connected to the exhaust passage 4 at the branch point 37. A portion of the exhaust passage 4 downstream of the branch point 37 is referred to as a downstream portion 41. The branch point 37 may be provided in the exhaust passage 4 between the NOx catalyst 24 and the ammonia oxidation catalyst 26.

The second branch passage 32 has one end 38 connected to the exhaust passage 4 upstream of the NOx catalyst 24 and the other end 39 connected to the tank 33. A branch point 40 is provided in the exhaust passage 4 between the filter 23 and the NOx catalyst 24, and the one end 38 is connected to the exhaust passage 4 at the branch point 40. The branch point 40 is located upstream of the urea water injection valve 25. The branch point 40 may be provided in the exhaust passage 4 between the oxidation catalyst 22 and the filter 23, or may be provided in the exhaust passage 4 upstream of the oxidation catalyst 22.

The valve mechanism 34 is configured to switch open and closed states of the first branch passage 31, the second branch passage 32, and the downstream portion 41. The valve mechanism 34 includes a first valve V2 (simply referred to as a valve V2) provided in the first branch passage 31, a second valve V4 (simply referred to as a valve V4) provided in the second branch passage 32, and a third valve V1 (simply referred to as a valve V1) provided in the downstream portion 41. The valves V2, V4, and V1 are implemented by two-way solenoid valves that simply open and close.

The exhaust gas aftertreatment device 30 of the present embodiment includes a pump 42 that is provided in the first branch passage 31 and pressure-feeds exhaust to the tank 33. In the present embodiment, the pump 42 is implemented by a compressor 43C of a turbocharger 43.

That is, an additional turbocharger 43 different from the turbocharger 14 is provided, and the exhaust is pressure-fed to the tank 33 using the compressor 43C of the turbocharger 43. Another exhaust passage that bypasses the exhaust passage 4 (or is parallel to the exhaust passage 4), that is, a bypass passage 44 is provided, and one end 45 of the bypass passage 44 is connected to the exhaust manifold 20. The other end 46 of the bypass passage 44 is connected to the exhaust passage 4 downstream of the valve V1. A turbine 43T of the turbocharger 43 is provided in the bypass passage 44.

When the turbine 43T is rotationally driven by the exhaust flowing through the bypass passage 44, the compressor 43C coaxially connected to the turbine 43T is rotationally driven. At this time, the compressor 43C suctions, pressurizes, and discharges the exhaust so that the exhaust flows from the one end 35 toward the other end 36. That is, when the turbine 43T is rotationally driven by the exhaust and the turbocharger 43 is operated, the compressor 43C is rotationally driven, a flow of the exhaust from the one end 35 toward the other end 36 (that is, toward the tank 33) is generated, and the exhaust is pressure-fed to the tank 33.

A fourth valve V3 (simply referred to as a valve V3) is provided in the bypass passage 44 upstream of the turbine 43T. The valve V3 is also implemented by a two-way solenoid valve that simply opens and closes. The valve V3 functions as a switch that switches between supplying and stopping the exhaust to the turbine 43T and switches between operating and stopping the turbocharger 43. The valve V3 is also a component of the valve mechanism 34.

A temperature sensor 51 for detecting the exhaust temperature T on an inlet side of the NOx catalyst 24 and a pressure sensor 52 for detecting the pressure P in the tank 33 are connected to the ECU 100. The ECU 100 controls the valves V1 to V4 based on the exhaust temperature T detected by the temperature sensor 51. The ECU 100 also controls the valves V1 to V4 based on the tank internal pressure P detected by the pressure sensor 52.

The temperature sensor 51 is provided in the exhaust passage 4 downstream of the branch point 40. In the present embodiment, the temperature sensor 51 is provided in the exhaust passage 4 downstream of the urea water injection valve 25. The pressure sensor 52 is provided in the tank 33.

Next, the control of the present embodiment will be described.

Figure 2:
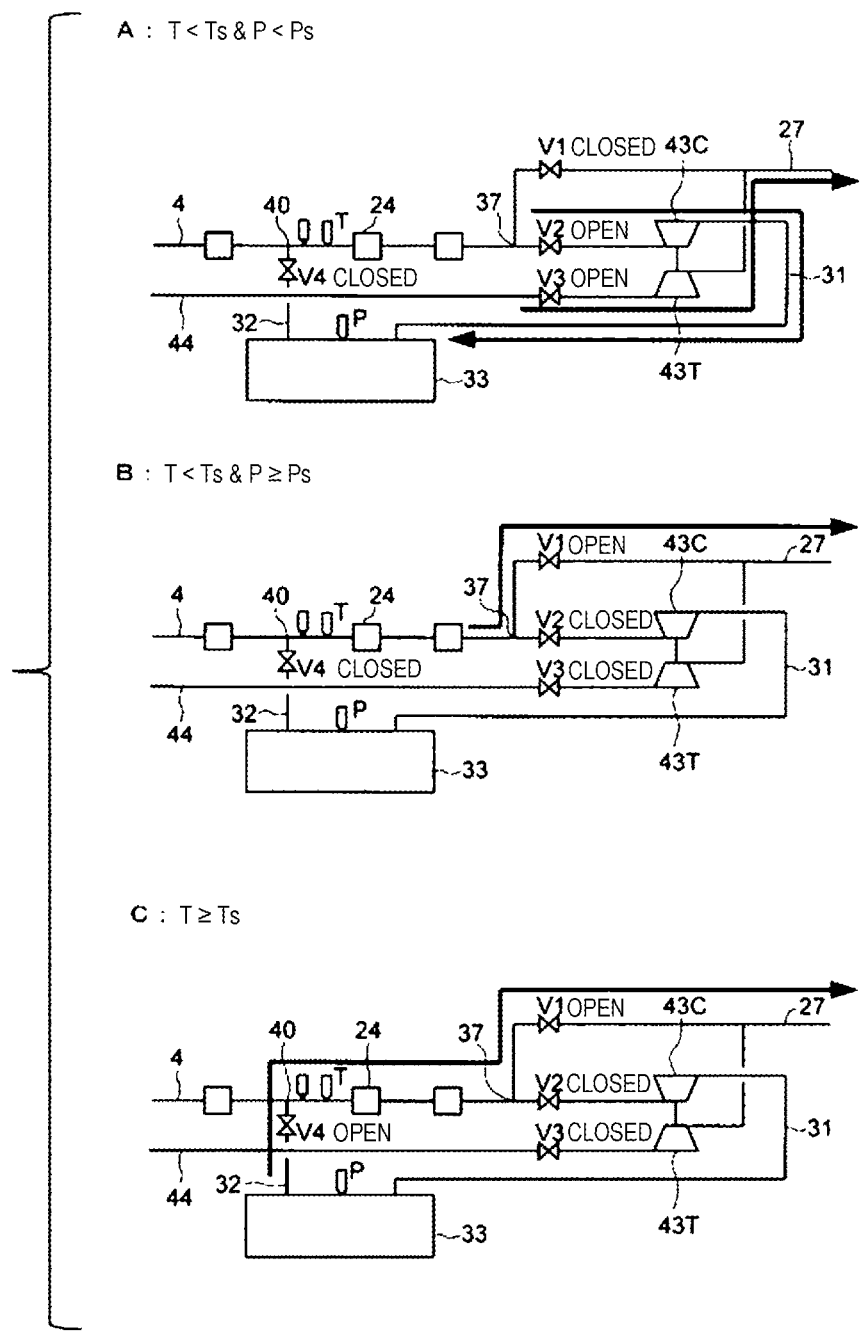
FIG. 2 is a schematic diagram showing valve patterns of a valve mechanism of the first embodiment.

FIG. 2 shows a valve pattern representing open and closed states of the valves V1 to V4 provided in the valve mechanism 34. In a valve pattern A (simply referred to as a pattern A) shown at the top of FIG. 2, the valve V1 is closed, the valve V2 is open, the valve V3 is open, and the valve V4 is closed. The pattern A is executed by the ECU 100 when the exhaust temperature T detected by the temperature sensor 51 is less than a predetermined threshold Ts (T<Ts) and the tank internal pressure P detected by the pressure sensor 52 is less than a predetermined threshold Ps (P<Ps).

The threshold Ts of the exhaust temperature T is set in advance through tests or the like as a minimum value of the inlet-side exhaust temperature T at which the NOx catalyst 24 can be regarded as active, and is stored in the ECU 100. The threshold Ts is, for example, 180° C.

The threshold Ps of the tank internal pressure P is set equal to a maximum tank internal pressure that can be increased by pressure-feeding the exhaust by the compressor 43C, in other words, the tank internal pressure when the tank 33 is full of exhaust, and is stored in the ECU 100.

After the cold start of the engine, the exhaust temperature T is not sufficiently increased and is less than the threshold Ts. At this time, the ECU 100 determines that the NOx catalyst 24 is still inactive. Meanwhile, the tank internal pressure P is also less than the threshold Ps, and at this time, the ECU 100 determines that the tank 33 is not full. When these two conditions are satisfied, the ECU 100 executes the pattern A.

Thus, as indicated by a solid arrow, the turbine 43T is driven by the exhaust flowing through the bypass passage 44, which drives the compressor 43C, and the exhaust flows through the first branch passage 31 from the one end 35 to the other end 36 and is supplied to the tank 33 sequentially. As a result, the tank 33 stores high NOx concentration exhaust (referred to as unpurified gas) from which NOx is not substantially removed by the NOx catalyst 24.

On the other hand, since the valve V1 is closed, the exhaust does not flow from the branch point 37 to the valve V1, and at the branch point 37, the exhaust is exclusively introduced from the exhaust passage 4 to the first branch passage 31. The exhaust after driving the turbine 43T is released into the atmosphere from the bypass passage 44 through the exhaust passage 4.

Thus, when the NOx catalyst 24 is inactive, the unpurified gas can be stored in the tank 33. Thus, NOx emissions into the atmosphere can be reduced or prevented.

Next, a valve pattern B (simply referred to as a pattern B) shown in the second row from the top of FIG. 2 will be described. In the pattern B, the valve V1 is open, the valve V2 is closed, the valve V3 is closed, and the valve V4 is closed. The pattern B is executed by the ECU 100 when the exhaust temperature T is less than the threshold Ts (T<Ts) and the tank internal pressure P is greater than or equal to the threshold Ps (P≥Ps).

In the pattern A, as the unpurified gas is stored in the tank 33, the tank internal pressure P increases, and eventually the tank internal pressure P may reach the threshold Ps before the exhaust temperature T reaches the threshold Ts. In this case, the ECU 100 executes the pattern B. When the tank internal pressure P is greater than or equal to the threshold Ps, the ECU 100 determines that the tank 33 is full.

Thus, as indicated by a solid arrow, the exhaust does not flow through the first branch passage 31 and the bypass passage 44, and the turbine 43T and the compressor 43C are stopped. Since the valve V1 is open, the exhaust flows exclusively through the exhaust passage 4 and is released into the atmosphere at the downstream end 27.

Thus, when the tank 33 becomes full before the NOx catalyst 24 becomes active, the pressure-feeding of the unpurified gas into the tank 33 is stopped, so that unnecessary pressure-feeding and energy consumption can be avoided.

Next, a valve pattern C (simply referred to as a pattern C) shown at the bottom of FIG. 2 will be described. In the pattern C, the valve V1 is open, the valve V2 is closed, the valve V3 is closed, and the valve V4 is open. The pattern C is executed by the ECU 100 when the exhaust temperature T is greater than or equal to the threshold Ts (T≥Ts). When the exhaust temperature T is greater than or equal to the threshold Ts, the ECU 100 determines that the NOx catalyst 24 is active.

When the pattern C is executed, as indicated by a solid arrow, since the valve V4 is open, the unpurified gas stored in the tank 33 is returned to the exhaust passage 4 upstream of the NOx catalyst 24 through the second branch passage 32. Then, the unpurified gas joins the exhaust flowing through the exhaust passage 4 upstream of the branch point 40. After joining, the exhaust containing the unpurified gas passes through the NOx catalyst 24 which becomes activate. At this time, NOx in the exhaust containing NOx in the unpurified gas is removed. Since the valve V1 is open, the exhaust after passing through the NOx catalyst 24 passes through the ammonia oxidation catalyst 2, then flows exclusively from the branch point 37 to the valve V1, and is released into the atmosphere at the downstream end 27. Since the valve V2 is closed, the exhaust is prevented from flowing into the first branch passage 31. Since the valve V3 is closed, the turbine 43T and the compressor 43C are stopped.

The urea water injection valve 25 is operated when the exhaust temperature T is greater than or equal to the threshold Ts, and is stopped when the exhaust temperature T is less than the threshold Ts.

Thus, the unpurified gas stored in the tank 33 when the NOx catalyst 24 is inactive can be returned upstream of the NOx catalyst 24 when the NOx catalyst 24 is active to pass through the NOx catalyst 24, and NOx in the unpurified gas can be removed by the NOx catalyst 24. This can also reduce or prevent NOx emissions into the atmosphere.

In the present embodiment, since the pump 42 for pressure-feeding the unpurified gas to the tank 33 is provided, the unpurified gas can be stored in the tank 33 in a compressed state. As a result, the tank 33 having a smaller capacity can achieve the same gas storage amount as when the pump 42 is not provided, and the tank 33 can be downsized. The cargo space of the vehicle can be enlarged.

However, when a large-capacity tank 33 is allowed, the pump 42 may be omitted.

In the present embodiment, since the pump 42 is implemented by the compressor 43C of the turbocharger 43, the existing turbocharger 43 can be used and the manufacturing cost can be reduced. Since the pump 42 can be driven using the exhaust from the engine body 2, the energy efficiency can be improved.

In the present embodiment, since the valve mechanism 34 is controlled based on not only an active state of the NOx catalyst 24 (specifically, the inlet-side exhaust temperature of the NOx catalyst 24) but also the tank internal pressure P, the control can be further optimized.

Figure 3:
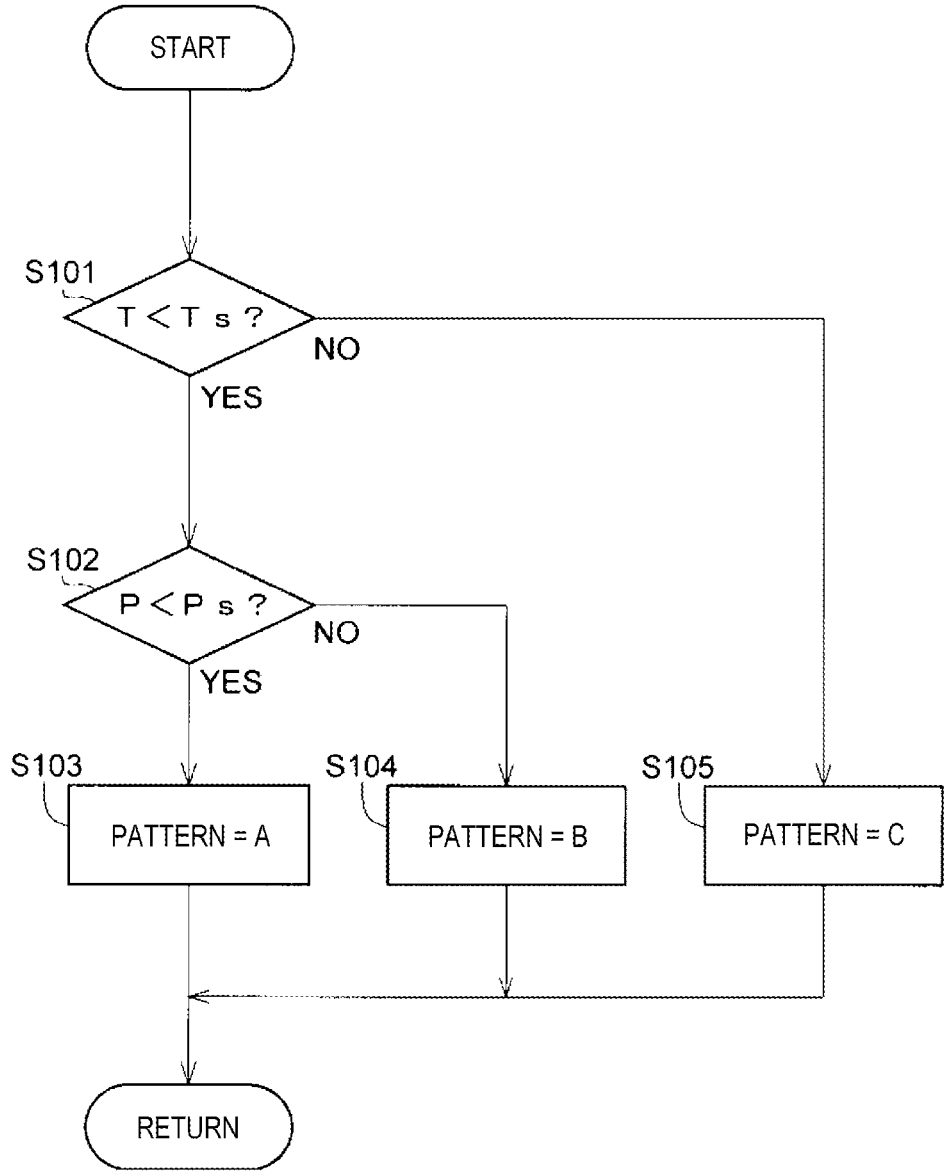
FIG. 3 is a flowchart of a control method of the first embodiment.

Next, a control method of the present embodiment will be described with reference to FIG. 3. The illustrated routine is repeatedly executed by the ECU 100 at a predetermined calculation cycle τ (for example, 10 ms). The routine is started at the same time as the engine 1 is started.

First, in step S101, the ECU 100 determines whether the exhaust temperature T detected by the temperature sensor 51 is less than the threshold Ts (T<Ts).

When the exhaust temperature T is less than the threshold Ts, that is, when the NOx catalyst 24 is still inactive, the ECU 100 proceeds to step S102 and determines whether the tank internal pressure P detected by the pressure sensor 52 is less than the threshold Ps (P<Ps).

When the tank internal pressure P is less than the threshold Ps, that is, when the tank 33 is not yet full, the ECU 100 proceeds to step S103 and controls the valve mechanism 34 to implement the pattern A, closes the valve V1, opens the valve V2, opens the valve V3, and closes the valve V4. As a result, as shown at the top of FIG. 2, the unpurified gas is pressure-fed into the tank 33 and stored or recovered.

On the other hand, in step S102, when the tank internal pressure P is greater than or equal to the threshold Ps, that is, when the tank 33 is full, the ECU 100 proceeds to step S104 and controls the valve mechanism 34 to implement the pattern B, opens the valve V1, closes the valve V2, closes the valve V3, and closes the valve V4. As a result, as shown in the second row from the top of FIG. 2, the pressure-feeding and storage of the unpurified gas are stopped.

In step S101, when the exhaust temperature T is greater than or equal to the threshold Ts, that is, when the NOx catalyst 24 is active, the ECU 100 proceeds to step S105 and controls the valve mechanism 34 to implement the pattern C, opens the valve V1, closes the valve V2, closes the valve V3, and opens the valve V4. As a result, as shown at the bottom of FIG. 2, the unpurified gas in the tank 33 is returned to the exhaust passage 4 and purified by the NOx catalyst 24.

Second Embodiment

Next, a second embodiment of the present disclosure will be described. The description of the same parts as those in the first embodiment will be omitted, and differences from the first embodiment will be mainly described.

Figure 4:
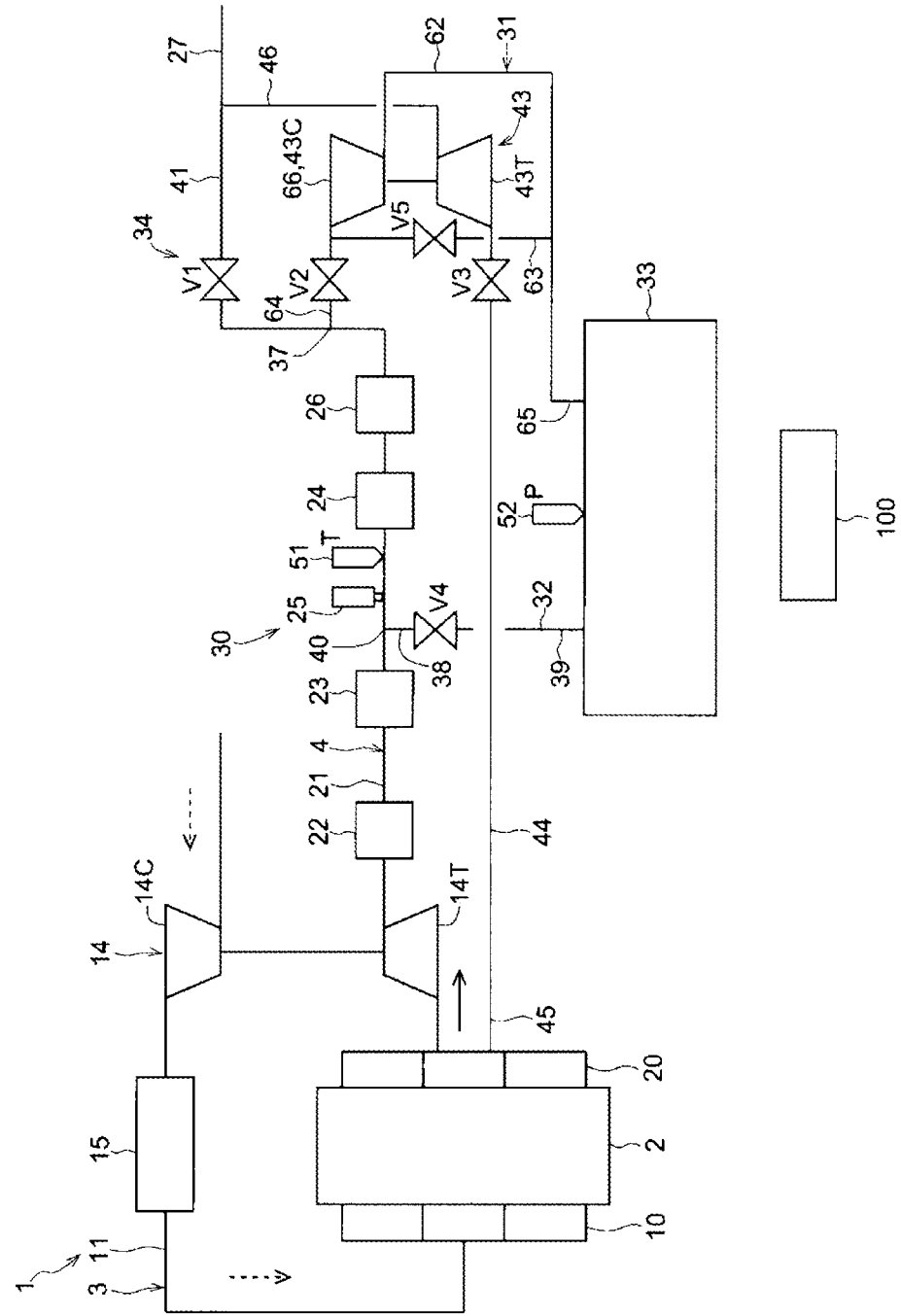
FIG. 4 is a schematic diagram showing an internal combustion engine of a second embodiment.

FIG. 4 is a schematic diagram of the engine 1 according to the second embodiment. The present embodiment differs from the first embodiment in configurations of the first branch passage 31 and the valve mechanism 34 of the exhaust gas aftertreatment device 30.

The first branch passage 31 of the present embodiment includes a main passage 62 that connects the exhaust passage 4 downstream of the NOx catalyst 24 and the tank 33, and a bypass passage 63 that bypasses the main passage 62. The main passage 62 has one end 64 connected to the exhaust passage 4 at the branch point 37 and the other end 65 connected to the tank 33.

The exhaust gas aftertreatment device 30 of the present embodiment includes a negative pressure pump 66 that is provided in the first branch passage 31 and suctions exhaust from the tank 33. The negative pressure pump 66 of the present embodiment is implemented by the compressor 43C of the turbocharger 43, as described above.

The compressor 43C is provided in the main passage 62. One end of the bypass passage 63 is connected to the main passage 62 closer to the branch point 37 than the compressor 43C, and the other end of the bypass passage 63 is connected to the main passage 62 closer to the tank 33 than the compressor 43C.

The valve mechanism 34 includes a fifth valve V5 (simply referred to as a valve V5) provided in the bypass passage 63. The valve V5 is also implemented by a two-way solenoid valve that simply opens and closes.

The way of connecting the compressor 43C to the first branch passage 31 (specifically, the main passage 62) is opposite to that in the first embodiment. That is, as shown in FIG. 1, in the first embodiment, an inlet of the compressor 43C is connected to the first branch passage 31 close to the branch point 37, and an outlet of the compressor 43C is connected to the first branch passage 31 close to the tank 33.

On the other hand, in the present embodiment, as shown in FIG. 4, the inlet of the compressor 43C is connected to the main passage 62 close to the tank 33, and the outlet of the compressor 43C is connected to the main passage 62 close to the branch point 37.

As a result, when the compressor 43C is rotationally driven, a flow direction of the exhaust is opposite to that in the first embodiment, and the exhaust flows from the tank 33 toward the branch point 37. As a result, the exhaust is suctioned or purged from the tank 33, and the pressure in the tank 33 is reduced to negative pressure.

Next, the control of the present embodiment will be described.

Figure 5:
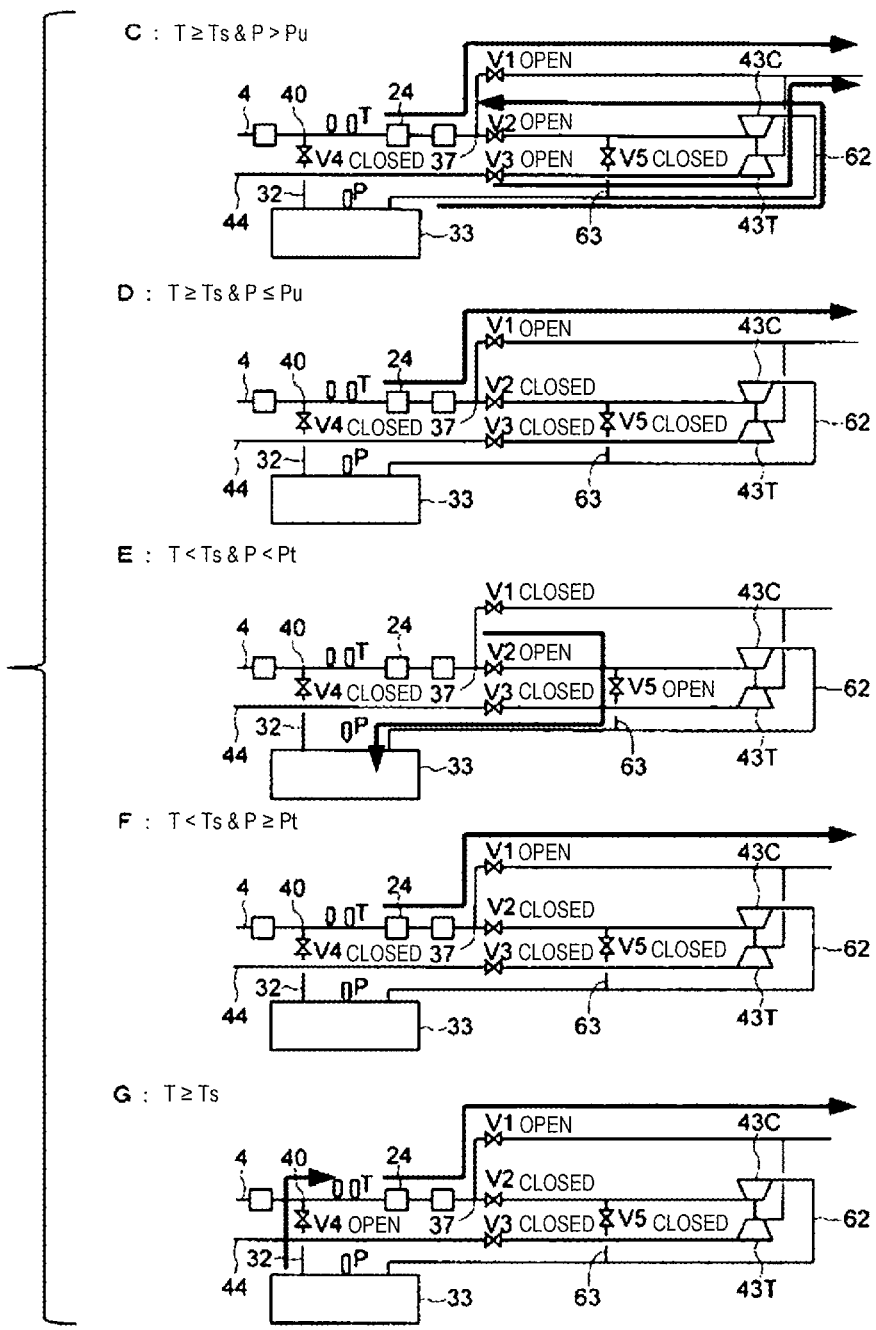
FIG. 5 is a schematic diagram showing valve patterns of a valve mechanism of the second embodiment.

FIG. 5 shows a valve pattern representing open and closed states of the valves V1 to V5 provided in the valve mechanism 34. In a valve pattern C (simply referred to as a pattern C) shown at the top of FIG. 5, the valve V1 is open, the valve V2 is open, the valve V3 is open, the valve V4 is closed, and the valve V5 is closed. The pattern C is executed by the ECU 100 when the exhaust temperature T detected by the temperature sensor 51 is greater than or equal to the threshold Ts (T≥Ts) and the tank internal pressure P detected by the pressure sensor 52 is greater than a predetermined first threshold Pu (P>Pu).

The threshold Ts of the exhaust temperature T is the same as described above. The first threshold Pu of the tank internal pressure P is set equal to a minimum tank internal pressure that can be reduced by exhaust suction by the compressor 43C, in other words, the tank internal pressure when the tank 33 is in a maximum purge state, and is stored in the ECU 100. The first threshold Pu is, for example, −300 kPa.

As the engine warms up after a cold start, the exhaust temperature T rises and reaches the threshold Ts or more. In this case, the ECU 100 determines that the NOx catalyst 24 is active. At this time, the ECU 100 controls the valve mechanism 34 to send the unpurified gas in the tank 33 to the exhaust passage 4 so that the NOx catalyst 24 purifies the unpurified gas, which will be described later in detail. Thus, since the tank 33 is no longer in a negative pressure state, the ECU 100 executes the pattern C to restore the negative pressure.

Then, as indicated by a solid arrow, the turbine 43T is driven by the exhaust flowing through the bypass passage 44, which in turn drives the compressor 43C, and the exhaust is suctioned from the tank 33. As a result, the pressure in the tank 33 is reduced to negative pressure. The suctioned exhaust joins with the exhaust flowing through the exhaust passage 4 at the branch point 37 and is released into the atmosphere.

Thus, when the NOx catalyst 24 is active, the pressure in the tank 33 can be reduced to negative pressure.

Next, a valve pattern D (simply referred to as a pattern D) shown in the second row from the top of FIG. 5 will be described. In the pattern D, the valve V1 is open, the valve V2 is closed, the valve V3 is closed, the valve V4 is closed, and the valve V5 is closed. The pattern C is executed by the ECU 100 when the exhaust temperature T is greater than or equal to the threshold Ts (T≥Ts) and the tank internal pressure P is less than or equal to a first threshold Pu (P≤Ps).

In the pattern C, as the exhaust in the tank 33 is suctioned, the tank internal pressure P decreases and eventually reaches the first threshold Pu. In this case, the ECU 100 executes the pattern D. When the tank internal pressure P is less than or equal to the first threshold Pu, the ECU 100 determines that the negative pressurization in the tank 33 is ended.

When the pattern D is executed, as indicated by a solid arrow, the exhaust does not flow into and out of the tank 33, and the tank 33 is maintained in a sealed state in which the pressure is reduced to negative pressure. Then, the exhaust from the engine body 2 exclusively flows through the exhaust passage 4 and is released into the atmosphere.

Thus, since the negative pressure pump 66 is stopped after the negative pressurization in the tank 33 is ended, it is possible to avoid unnecessary suction and energy consumption.

Next, a valve pattern E (simply referred to as a pattern E) shown in the third row from the top of FIG. 5 will be described. In the pattern E, the valve V1 is closed, the valve V2 is open, the valve V3 is closed, the valve V4 is closed, and the valve V5 is open. The pattern E is executed by the ECU 100 when the exhaust temperature T is less than the threshold Ts (T<Ts) and the tank internal pressure P is less than a second threshold Pt (P<Pt).

The second threshold Pt of the tank internal pressure P is greater than the first threshold Pu and is set equal to the atmospheric pressure in the present embodiment. The second threshold Pt may be stored in the ECU 100 as a constant value equal to the standard average value of the atmospheric pressure, or may be a measured value detected by an atmospheric pressure sensor (not shown).

When the pattern E is executed, since the valves V2 and V5 are open as indicated by a solid arrow, the exhaust flowing into the main passage 62 from the branch point 37 is suctioned into the tank 33 in a negative pressure state through the bypass passage 63. On the other hand, since the valve V1 is closed, the exhaust does not flow into the exhaust passage 4 downstream of the branch point 37.

As a result, when the NOx catalyst 24 is inactive (T<Ts), the unpurified gas can be stored in the tank 33 without being released into the atmosphere, and NOx emissions into the atmosphere can be reduced or prevented.

Next, a valve pattern F (simply referred to as a pattern F) shown in the second row from the bottom of FIG. 5 will be described. In the pattern F, the valve V1 is open, the valve V2 is closed, the valve V3 is closed, the valve V4 is closed, and the valve V5 is closed. The pattern F is executed by the ECU 100 when the exhaust temperature T is less than the threshold Ts (T<Ts) and the tank internal pressure P is greater than or equal to the second threshold Pt (P≥Pt).

In the pattern E, as the unpurified gas is suctioned into the tank 33, the tank internal pressure P increases and eventually reaches the second threshold Pt. In this case, the ECU 100 executes the pattern F. When the tank internal pressure P is greater than or equal to the second threshold Pt, the ECU 100 determines that the suction into the tank 33 is ended.

Thus, as indicated by a solid arrow, the exhaust does not flow through the first branch passage 31 (the main passage 62 and the bypass passage 63), and the tank 33 is full and confined with the unpurified gas. Then, the exhaust flows exclusively through the exhaust passage 4 and is released into the atmosphere.

Thus, when the tank 33 is full before the NOx catalyst 24 becomes active, the suction of the unpurified gas into the tank 33 is stopped and the tank 33 is held in a sealed state, so that the unpurified gas can be stored in the tank 33 without leakage.

Next, a valve pattern G (simply referred to as a pattern G) shown at the bottom of FIG. will be described. In the pattern G, the valve V1 is open, the valve V2 is closed, the valve V3 is closed, the valve V4 is open, and the valve V5 is closed. The pattern G is executed by the ECU 100 when the exhaust temperature T is greater than or equal to the threshold Ts (T≥Ts). The effects of the pattern G are the same as those of the pattern C of the first embodiment.

When the pattern G is executed, as indicated by a solid arrow, the unpurified gas stored in the tank 33 is returned to the exhaust passage 4 through the second branch passage 32 and passes through the NOx catalyst 24 which becomes activate. As a result, NOx in the unpurified gas is removed.

Thus, the unpurified gas stored in the tank 33 when the NOx catalyst 24 is inactive can be returned upstream of the NOx catalyst 24 when the NOx catalyst 24 is active to pass through the NOx catalyst 24, and NOx in the unpurified gas can be removed by the NOx catalyst 24. This can also reduce or prevent NOx emissions into the atmosphere.

In summary, in the present embodiment, when the NOx catalyst 24 is active, the negative pressure pump 66 is operated to reduce the pressure in the tank 33 to negative pressure in advance (pattern C), and when the engine is cold-started again after stopping and the NOx catalyst 24 is inactive, the unpurified gas is suctioned and stored in the tank 33 using the negative pressure (pattern E). When the NOx catalyst 24 is activated, the stored unpurified gas is returned to the exhaust passage 4 to pass through the NOx catalyst 24 (pattern G). Thus, emissions of NOx in the unpurified gas can be reduced or NOx can be prevented from being emitted into the atmosphere, and NOx can be reliably removed by the NOx catalyst 24.

In the present embodiment as well, since the negative pressure pump 66 is implemented by the compressor 43C of the turbocharger 43, the existing turbocharger 43 can be used and the manufacturing cost can be reduced. Since the negative pressure pump 66 can be driven using the exhaust from the engine body 2, the energy efficiency can be improved.

In the present embodiment as well, since the valve mechanism 34 is controlled based on not only an active state of the NOx catalyst 24 but also the tank internal pressure P, the control can be further optimized.

Figure 6:
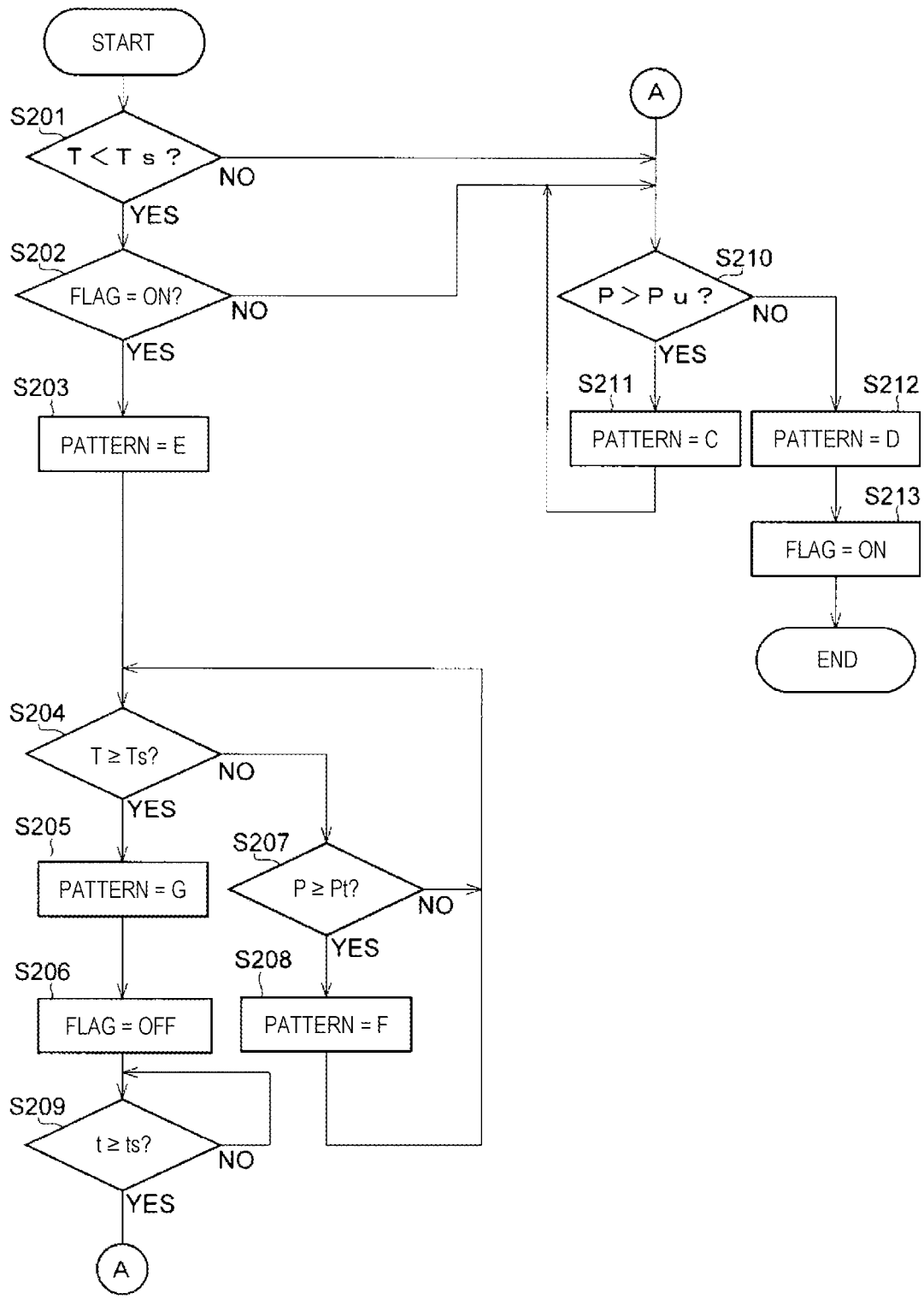
FIG. 6 is a flowchart of a control method of the second embodiment.

Next, a control method of the present embodiment will be described with reference to FIG. 6. The illustrated flowchart is started at the same time as the engine 1 is started.

First, in step S201, the ECU 100 determines whether the exhaust temperature T detected by the temperature sensor 51 is less than the threshold Ts (T<Ts).

When the exhaust temperature T is less than the threshold Ts, the ECU 100 proceeds to step S202 to determine whether a predetermined flag is on. As will be understood later, this flag is turned on when the negative pressurization of the tank 33 is ended.

When the flag is on, in step S203, the ECU 100 controls the valve mechanism 34 to implement the pattern E, closes the valve V1, opens the valve V2, closes the valve V3, closes the valve V4, and opens the valve V5. As a result, as shown in the third row from the top of FIG. 5, the unpurified gas is suctioned into the tank 33.

Next, in step S204, the ECU 100 determines whether the exhaust temperature T is greater than or equal to the threshold Ts (T≥Ts).

When the exhaust temperature T is greater than or equal to the threshold Ts, the ECU 100 proceeds to step S205 and controls the valve mechanism 34 to implement the pattern G. Then, the valve V1 is open, the valve V2 is closed, the valve V3 is closed, the valve V4 is open, and the valve V5 is closed. As a result, as shown at the bottom of FIG. 5, the unpurified gas in the tank 33 is returned to the exhaust passage 4 and purified by the NOx catalyst 24. Thereafter, the ECU 100 turns off the flag in step S206 and proceeds to step S209.

On the other hand, when the exhaust temperature T is less than the threshold Ts in step S204, the ECU 100 proceeds to step S207 and determines whether the tank internal pressure P detected by the pressure sensor 52 is greater than or equal to the second threshold Pt (P≥Pt).

When the tank internal pressure P is less than the second threshold Pt, the ECU 100 returns to step S204 to continue the suction, and when the tank internal pressure P is greater than or equal to the second threshold Pt, the ECU 100 proceeds to step S208 to control the valve mechanism 34 so as to implement the pattern F. As a result, the valve V1 is open, the valve V2 is closed, the valve V3 is closed, the valve V4 is closed, and the valve V5 is closed. As a result, as shown in the second row from the bottom of FIG. 5, the suction of the unpurified gas is stopped.

Next, in step S209, the ECU 100 determines whether an elapsed time t measured from the time point when the exhaust temperature T is greater than or equal to the threshold Ts reaches a predetermined threshold ts or more. The threshold ts is experimentally obtained in advance as a minimum time during which the unpurified gas is completely discharged from the tank 33 and is stored in the ECU 100. That is, here, it is determined whether the unpurified gas is completely discharged from the tank 33.

Alternatively, the pressure in the exhaust passage 4 at the branch point 40 may be detected or estimated, and when the tank internal pressure P is equal to that pressure, it may be determined that the discharge is ended.

When the elapsed time t is less than the threshold ts, the ECU 100 repeats step S209 and waits, and when the elapsed time t is greater than or equal to the threshold ts, the ECU 100 proceeds to step S210.

In step S210, the ECU 100 determines whether the tank internal pressure P is greater than the first threshold Pu (P>Pu).

When the tank internal pressure P is greater than the first threshold Pu, the ECU 100 proceeds to step S211 and controls the valve mechanism 34 to implement the pattern C. Then, the valve V1 is open, the valve V2 is open, the valve V3 is open, the valve V4 is closed, and the valve V5 is closed. As a result, as shown at the top of FIG. 5, the exhaust in the tank 33 is suctioned by the compressor 43C, and the pressure in the tank 33 is reduced to negative pressure. If the tank internal pressure P continues to be greater than the first threshold Pu, the ECU 100 repeats step S211.

On the other hand, when the tank internal pressure P is less than or equal to the first threshold Pu in step S210, the ECU 100 proceeds to step S212 and controls the valve mechanism 34 to implement the pattern D. Then, the valve V1 is open, the valve V2 is closed, the valve V3 is closed, the valve V4 is closed, and the valve V5 is closed. As a result, as shown in the second row from the top of FIG. 5, the suction or the negative pressurization is stopped or ended, and the inside of the tank 33 is maintained in a negative pressure state.

Thereafter, the ECU 100 turns on the flag in step S213 and then ends the control.

In the case where the pressure in the tank 33 is reduced to negative pressure and the control is ended, when the engine is stopped, the control is started from the negative pressure state when the engine is cold-started again next time. In this case, steps S201 and S202 are YES, the pattern E is executed in step S203, and the unpurified gas is suctioned into the tank 33. This can prevent the unpurified gas from being emitted into the atmosphere.

As described above, when the NOx catalyst 24 is switched from inactive to active (S204: YES), the ECU 100 of the present embodiment controls the valve mechanism 34 to close the first branch passage 31, open the second branch passage 32, and open the downstream portion 41 (pattern G), then controls the valve mechanism 34 to close the second branch passage 32 and open the first branch passage 31, and controls the negative pressure pump 66 to operate (pattern C).

When the exhaust temperature T is greater than or equal to the threshold Ts in step S201 and when the flag is off in step S202, the ECU 100 proceeds to step S210.

Although embodiments of the present disclosure have been described in detail above, various other embodiments and modifications of the present disclosure can be considered.

Figure 7:
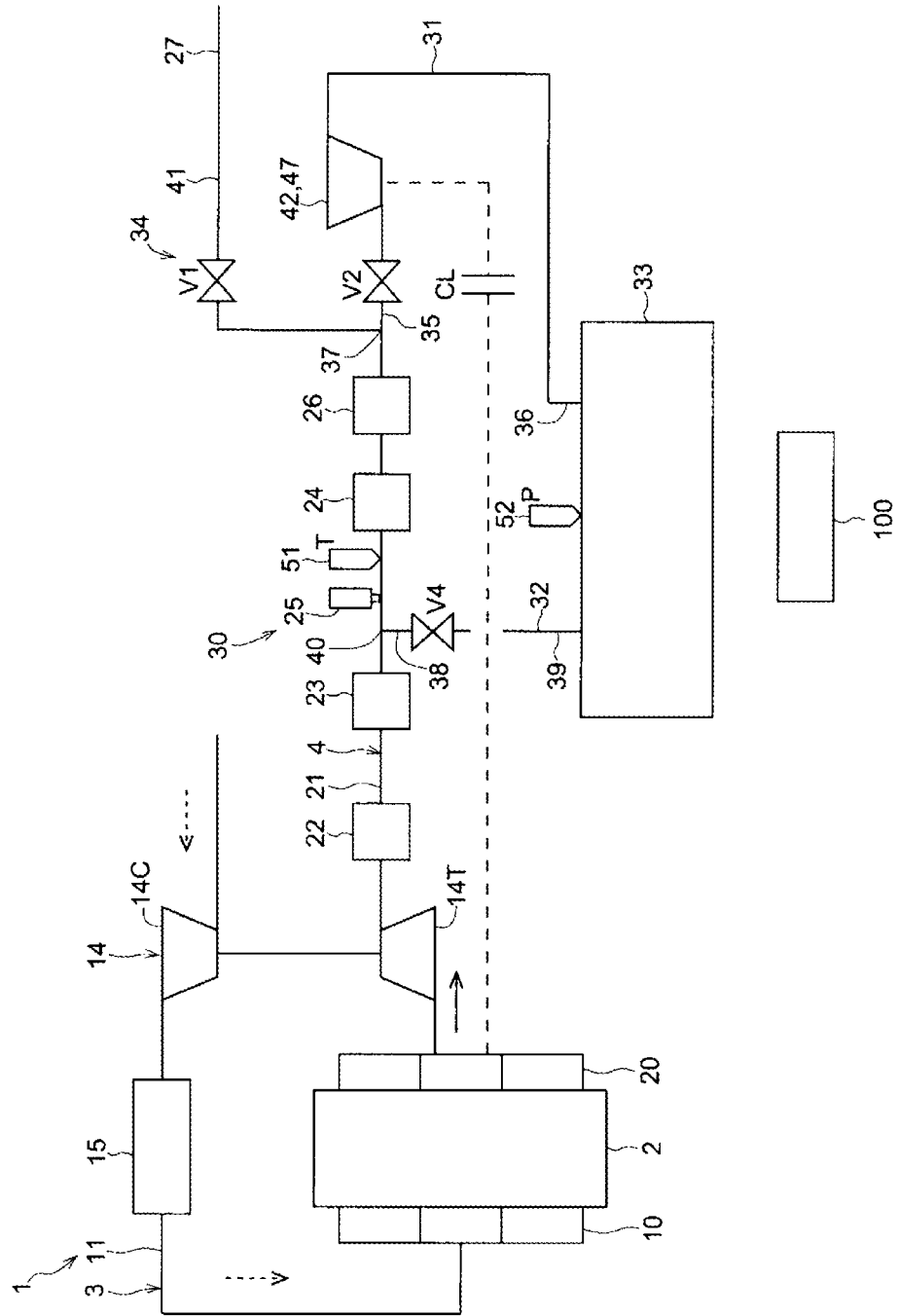
FIG. 7 is a schematic diagram showing a modification of the first embodiment.

(1) FIG. 7 shows a modification of the first embodiment.
In this modification, the pump 42 for pressure-feeding exhaust to the tank 33 is implemented by the compressor 47 of a supercharger.

As is well known, the supercharger is a rotary machine that receives driving force from an engine and rotates the compressor 47. By using the compressor 47 instead of the compressor 43C of the turbocharger 43, the same effects as those of the first embodiment can be achieved.

Instead of the valve V3, a clutch CL for connecting and disconnecting driving force from the engine 1 to the supercharger is provided. The clutch CL is controlled by the ECU 100. The opening of the valve V3 corresponds to the connection of the clutch CL, and the closing of the valve V3 corresponds to the disconnection of the clutch CL.

Although not illustrated, the same modification may be performed in the second embodiment. That is, the negative pressure pump 66 that suctions exhaust from the tank 33 may be implemented by the compressor 47 of a supercharger. In this case, the clutch CL is provided instead of the valve V3.

(2) The pump 42 of the first embodiment and the negative pressure pump 66 of the second embodiment are not limited to a compressor of a turbocharger or supercharger and can be implemented by any pump. For example, an air pump or vacuum pump as an accessory driven by an engine can be used, or an electric air pump or vacuum pump can be used.

(3) The valve configuration and arrangement of the valve mechanism 34 may be other than those in the above embodiments, and for example, different types of valves such as a three-way solenoid valve may be used, or the number of valves may be changed.

Configurations of the above embodiments and modifications can be partially or entirely combined as long as there is no particular contradiction. Embodiments of the present disclosure are not limited to the above embodiments, and all modifications, applications, and equivalents which fall within the spirit of the present disclosure as defined by the claims are included in the present disclosure. Accordingly, the present disclosure should not be construed as being limited, and can be applied to any other technique belonging to the scope of the spirit of the present disclosure.

The present application is based on a Japanese Patent Application (Japanese Patent Application No. 2021-039430) filed on Mar. 11, 2021, and the contents thereof are incorporated herein by reference.

INDUSTRIAL APPLICABILITY

The exhaust gas aftertreatment device according to the present disclosure is useful in that harmful components in the exhaust can be prevented from being emitted into the atmosphere when a catalyst is inactive, and an internal combustion engine can be cold-started while maintaining high non-hazardous properties.

REFERENCE SIGNS LIST 1 internal combustion engine (engine)
4 exhaust passage
24 NOx catalyst
30 exhaust gas aftertreatment device
31 first branch passage
32 second branch passage
33 tank
34 valve mechanism
35 one end
36 other end
37 branch point
38 one end
39 other end
41 downstream portion
42 pump
43 turbocharger
43C compressor
47 compressor
66 negative pressure pump
100 electronic control unit (ECU)

The invention claimed is:

1. An exhaust gas aftertreatment device of internal combustion engine, the exhaust gas aftertreatment device comprising:
a catalyst provided in an exhaust passage;
a first branch passage having one end connected to the exhaust passage downstream of the catalyst;
a second branch passage having one end connected to the exhaust passage upstream of the catalyst;
a tank to which an other end of the first branch passage and the other end of the second branch passage are connected and capable of storing exhaust;
a valve mechanism configured to switch open and closed states of the first branch passage, the second branch passage, and a downstream portion of the exhaust passage downstream of a branch point to which the one end of the first branch passage is connected;
a control unit configured to control the valve mechanism, wherein the control unit is configured to control the valve mechanism to open the first branch passage, close the second branch passage and close the downstream portion when the catalyst is inactive, and control the valve mechanism to close the first branch passage, open the second branch passage and open the downstream portion when the catalyst is active; and
a negative pressure pump provided in the first branch passage and configured to suction exhaust from the tank,
wherein the control unit is further configured to control the valve mechanism to close the first branch passage, open the second branch passage, and open the downstream portion when the catalyst is switched from inactive to active, and then controls the valve mechanism to close the second branch passage and open the first branch passage and controls the negative pressure pump to operate.

2. The exhaust gas aftertreatment device of internal combustion engine according to claim 1, wherein the negative pressure pump is implemented by a compressor of a turbocharger or supercharger.

3. The exhaust gas aftertreatment device of internal combustion engine according to claim 1, wherein the control unit is further configured to control the valve mechanism also based on a pressure in the tank.

* * * * *